(12) United States Patent
Waechter et al.

(10) Patent No.: US 11,243,903 B2
(45) Date of Patent: Feb. 8, 2022

(54) NONVOLATILE LOGIC MEMORY FOR COMPUTING MODULE RECONFIGURATION

(71) Applicant: TEXAS INSTRUMENTS INCORPORATED, Dallas, TX (US)

(72) Inventors: Andreas Waechter, Bavaria (DE); Mark Jung, Bavaria (DE); Steven Craig Bartling, Plano, TX (US); Sudhanshu Khanna, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/658,928

(22) Filed: Oct. 21, 2019

(65) Prior Publication Data
US 2020/0125525 A1 Apr. 23, 2020

Related U.S. Application Data

(63) Continuation of application No. 14/887,885, filed on Oct. 20, 2015, now Pat. No. 10,452,594.

(51) Int. Cl.
*G06F 13/42* (2006.01)
*G06F 13/28* (2006.01)
*H04L 29/08* (2006.01)

(52) U.S. Cl.
CPC ......... *G06F 13/4234* (2013.01); *G06F 13/28* (2013.01); *H04L 67/303* (2013.01)

(58) Field of Classification Search
None
See application file for complete search history.

(56) References Cited

U.S. PATENT DOCUMENTS

| 6,081,752 | A | * | 6/2000 | Benson, IV | G06F 1/26 700/79 |
|---|---|---|---|---|---|
| 6,198,651 | B1 | | 3/2001 | Lee et al. | |
| 6,226,556 | B1 | | 5/2001 | Itkin | |
| 6,711,692 | B1 | | 3/2004 | Maeda | |
| 6,901,298 | B1 | | 5/2005 | Govindaraj | |

(Continued)

FOREIGN PATENT DOCUMENTS

| CN | 101458668 A | 6/2009 |
|---|---|---|
| CN | 102789134 A | 11/2012 |
| CN | 102929805 A | 2/2013 |

OTHER PUBLICATIONS

Nang, Y., et al., "A 3us Wake-up Time Nonvolatile Processor Based on Ferroelectric Flip-Flops," IEEE 2012 (4 pages).

(Continued)

*Primary Examiner* — Henry Tsai
*Assistant Examiner* — Christopher A Bartels
(74) *Attorney, Agent, or Firm* — Charles F. Koch; Charles A. Brill; Frank D. Cimino

(57) ABSTRACT

Configuration states for a computing device and/or associated peripherals ("profiles") are stored in one or more non-volatile logic ("NVL") arrays. Using the non-volatile sub-system for the computing device, triggers for reconfiguration of the respective device or peripherals are provided to an NVL array controller, which controls provision of the new profile(s) for the respective device or peripherals over a dedicated bus to a configuration register that stores the active profiles for the device and associated peripherals.

17 Claims, 7 Drawing Sheets

(56) References Cited

U.S. PATENT DOCUMENTS

| | | | |
|---|---|---|---|
| 7,225,353 B1 | 5/2007 | Wong | |
| 7,639,056 B2 | 12/2009 | Gururajarao | |
| 7,812,633 B1 | 10/2010 | Lee et al. | |
| 8,056,088 B1 | 11/2011 | Dharmapurikar | |
| 8,892,789 B2* | 11/2014 | Spry | G06F 3/0655 |
| | | | 710/33 |
| 9,092,206 B2 | 7/2015 | Rzehak et al. | |
| 9,432,298 B1* | 8/2016 | Smith | H04L 49/9057 |
| 9,698,770 B1* | 7/2017 | Menezes | H03K 17/223 |
| 9,831,696 B2 | 11/2017 | Iida | |
| 10,037,071 B2 | 7/2018 | Dannenberg et al. | |
| 10,331,203 B2 | 6/2019 | Zwerg et al. | |
| 2004/0073818 A1 | 4/2004 | Cheok et al. | |
| 2004/0085846 A1 | 5/2004 | Yokozeki | |
| 2005/0141260 A1 | 6/2005 | Suzuki | |
| 2005/0251617 A1 | 11/2005 | Sinclair et al. | |
| 2006/0015683 A1 | 1/2006 | Ashmore | |
| 2006/0072369 A1 | 4/2006 | Madter | |
| 2006/0080515 A1 | 4/2006 | Spiers | |
| 2006/0242398 A1 | 10/2006 | Fontijn | |
| 2006/0279977 A1 | 12/2006 | Shiga | |
| 2007/0067435 A1* | 3/2007 | Landis | G06F 11/1484 |
| | | | 709/224 |
| 2007/0083743 A1 | 4/2007 | Tsang | |
| 2007/0136523 A1 | 6/2007 | Bonella | |
| 2007/0217404 A1 | 9/2007 | Kawamata | |
| 2008/0155242 A1 | 6/2008 | Beelitz | |
| 2008/0235443 A1* | 9/2008 | Chow | G06F 12/1416 |
| | | | 711/103 |
| 2008/0235471 A1 | 9/2008 | Feldman | |
| 2008/0265962 A1 | 10/2008 | Waldrip | |
| 2008/0320214 A1* | 12/2008 | Ma | G06F 12/0246 |
| | | | 711/103 |
| 2009/0144577 A1 | 6/2009 | Sarker | |
| 2009/0237570 A1 | 10/2009 | Paunonen | |
| 2009/0292937 A1 | 11/2009 | Bakker | |
| 2010/0006378 A1 | 10/2010 | Blasko | |
| 2011/0119506 A1 | 5/2011 | Tsai | |
| 2011/0197018 A1 | 8/2011 | Noh | |
| 2011/0202794 A1 | 8/2011 | Kim | |
| 2011/0231685 A1* | 9/2011 | Huang | G06F 1/325 |
| | | | 713/321 |
| 2012/0042206 A1 | 2/2012 | Di Domenico et al. | |
| 2012/0137075 A1 | 5/2012 | Voarbach | |
| 2012/0036346 A1 | 12/2012 | Bower | |
| 2012/0317343 A1 | 12/2012 | Fuchikami | |
| 2013/0031388 A1 | 1/2013 | Sakarda | |
| 2013/0042052 A1 | 2/2013 | Colgrove et al. | |
| 2013/0060993 A1* | 3/2013 | Park | G06F 16/248 |
| | | | 711/103 |
| 2013/0166866 A1 | 6/2013 | Yerushalmi et al. | |
| 2013/0326206 A1 | 12/2013 | Lueck et al. | |
| 2014/0006887 A1 | 1/2014 | Greene | |
| 2014/0047247 A1 | 2/2014 | Rzehak et al. | |
| 2014/0075088 A1 | 3/2014 | Bantling et al. | |
| 2014/0075089 A1* | 3/2014 | Bartling | G06F 1/3287 |
| | | | 711/102 |
| 2014/0075174 A1 | 3/2014 | Bartling | |
| 2014/0075232 A1 | 3/2014 | Bartling | |
| 2014/0086266 A1* | 3/2014 | Strait | H04W 56/00 |
| | | | 370/503 |
| 2014/0153325 A1 | 6/2014 | Wang et al. | |
| 2014/0208004 A1 | 7/2014 | Cohen et al. | |
| 2014/0337560 A1* | 11/2014 | Chun | G06F 12/0246 |
| | | | 711/103 |
| 2015/0106560 A1* | 4/2015 | Perego | G06F 12/0246 |
| | | | 711/105 |
| 2015/0189608 A1* | 7/2015 | Strait | H04W 56/001 |
| | | | 370/350 |
| 2015/0323983 A1 | 11/2015 | Hobson | |
| 2015/0378946 A1* | 12/2015 | Ali | G06F 13/4221 |
| | | | 710/308 |
| 2016/0246355 A1* | 8/2016 | Dannenberg | G06F 9/4418 |
| 2016/0266641 A1* | 9/2016 | Rogers | G01R 31/382 |
| 2016/0293231 A1* | 10/2016 | Shu | G11C 11/4096 |
| 2016/0344629 A1* | 11/2016 | Gray | H04L 49/106 |
| 2017/0185139 A1* | 6/2017 | Zwerg | G06F 1/3287 |
| 2018/0136843 A1* | 5/2018 | Lee | G06F 3/0659 |
| 2018/0136851 A1* | 5/2018 | Batra | G06F 3/0688 |
| 2020/0067768 A1* | 2/2020 | Dome | H04L 41/5054 |

OTHER PUBLICATIONS

Masui, S., et al., "Design and Applications of Ferroelectric Nonvolatile SRAM and Slip-Flop with Unlimited Read/Program Cycles and Stable Recall," IEEE 2003 Custom Integrated Circuits Conference—2003 (4 pages).

Udayakumar, K.R., et al., "Manufacturable High-Density 8 Mbit One Transistor-One Capacitor Embedded Ferroelectric Random Access Memory," Japanese Journal of Applied Physics, vol. 47, No. 4, 2008 (4 pages).

Moise, T.S., et al., "Electrical Properties of Submicron (>0.13um2) Ir/PZT/Ir Capacitors Formed on W plugs," IEEE 1999 (3 pages).

Moise, T.S., et al., "Demonstration of a 4Mb, High Density Ferroelectric Memory Embedded with a 130nm, 5LM Cu/FSG Logic Process," IEEE 2002 (4 pages).

Wang, Y., et al., "A Compression-based Area-efficient Recovery Architecture for Nonvolatile Processsors," EDAA 2012, dated Mar. 12-16, 2012, Dresden, Germany (6 pages).

Yu, W., et al., "A Non-Volatile Microcontroller with Integrated Floating-Gate Transistors," IEEE 2011 (6 pages).

TMS9900 Datasheet, programmable system interface; Texas Instruments; retrieved from web at http://www.alldatasheet.com/datasheet-pdf/29082/TI/TMS9900.html; 14 pages.

* cited by examiner

| PROFILE # | ARRAY ROW | STORED DATA | |
|---|---|---|---|
| N/A | 0 | RESERVED: HARDWARE TRIGGER ASSIGNMENT REGISTERS | |
| 1 | 1 | CONFIGURATION DATA OF MODULE 1 (x BIT) | MODULE 1 (3 PROFILES FOR 1 MODULE; 1 PROFILE PER ROW) |
| 2 | 2 | CONFIGURATION DATA OF MODULE 1 (x BIT) | |
| 3 | 3 | CONFIGURATION DATA OF MODULE 1 (x BIT) | |
| 4 | 4 | CONFIGURATION DATA OF MODULE 2 (x BIT) | MODULE 2 (2 PROFILES FOR 1 MODULE; 1 PROFILE PER ROW) |
| 5 | 5 | CONFIGURATION DATA OF MODULE 2 (x BIT) | |
| 6 | 6 | CONFIGURATION DATA OF MODULE 3 (x BIT) | MODULE 3 (1 PROFILES FOR 1 MODULE; 1 PROFILE PER 2 ROWS) |
| 6 | 7 | CONFIGURATION DATA OF MODULE 3 (x BIT) | |
| ○○○ | ○○○ | | |

| | | |
|---|---|---|
| ○○○ | ○○○ | CONFIGURATION DATA OF MODULE N-1 (x BIT) | 2nd AND HIGHER NVL ARRAYS
| ○○○ | M | CONFIGURATION DATA OF MODULE N (x BIT) | MODULE N (1 PROFILES FOR 1 MODULE; 1 PROFILE PER ROW) |

FIG. 2

| 305 | 310 | 315 | | | | | | | | |
|---|---|---|---|---|---|---|---|---|---|---|
| PROFILE # | ARRAY ROW | STORED DATA | | | | | | | | |
| N/A | 0 | RESERVED: HARDWARE TRIGGER ASSIGNMENT REGISTERS | | | | | | | | |
| 1 | 1 | N BIT MODULE IDENTIFIER | CONFIGURATION DATA FOR SELECTED IP (x BIT) | CONFIGURATION DATA FOR SELECTED IP (x BIT) | CONFIGURATION DATA FOR SELECTED IP (x BIT) | CONFIGURATION DATA FOR SELECTED IP (x BIT) | CONFIGURATION DATA FOR SELECTED IP (x BIT) | CONFIGURATION DATA FOR SELECTED IP (x BIT) | CONFIGURATION DATA FOR SELECTED IP (x BIT) | CONFIGURATION DATA FOR SELECTED IP (x BIT) |
| 2 | 2 | N BIT MODULE IDENTIFIER | | | | | | | | |
| 3 | 3 | N BIT MODULE IDENTIFIER | | | | | | | | |
| 4 | 4 | N BIT MODULE IDENTIFIER | | | | | | | | |
| 5 | 5 | N BIT MODULE IDENTIFIER | | | | | | | | |
| 6 | 6 | N BIT MODULE IDENTIFIER | | | | | | | | |
| 7 | 7 | N BIT MODULE IDENTIFIER | | | | | | | | |
| ○○○ | ○○○ | | | | | | | | | |

330 ↑

2nd AND HIGHER NVL ARRAYS

| ○○○ | 0 | N BIT MODULE IDENTIFIER | CONFIGURATION DATA FOR SELECTED IP (x BIT) |
|---|---|---|---|
| M | M | N BIT MODULE IDENTIFIER | CONFIGURATION DATA FOR SELECTED IP (x BIT) |

| | (N-1)*4 | (N-1)*4-1 | (N-1)*4-2 | (N-1)*4-3 | ... | 7 | 6 | 5 | 4 | 3 | 2 | 1 | 0 |
|---|---|---|---|---|---|---|---|---|---|---|---|---|---|
| 420 → | PROFILE N | PROFILE N | PROFILE N | PROFILE N | ○○○ | PROFILE 2 | PROFILE 2 | PROFILE 2 | PROFILE 2 | PROFILE 1 | PROFILE 1 | PROFILE 1 | PROFILE 1 |
| 410 → | 4 BIT HW TRIGGER ID | 4 BIT HW TRIGGER ID | 4 BIT HW TRIGGER ID | 4 BIT HW TRIGGER ID | ○○○ | 4 BIT HW TRIGGER ID | 4 BIT HW TRIGGER ID | 4 BIT HW TRIGGER ID | 4 BIT HW TRIGGER ID | 4 BIT HW TRIGGER ID | 4 BIT HW TRIGGER ID | 4 BIT HW TRIGGER ID | 4 BIT HW TRIGGER ID |

| N BIT HW TRIGGER IDENTIFIER (ID) | HW TRIGGER SIGNAL |
|---|---|
| 0000 | NO HW TRIGGER |
| 0001 | BOR RESET |
| 0010 | PUC RESET |
| 0011 | INTERRUPT FLAG FROM EUSCIx |
| 0100 | INTERRUPT FLAG FROM PORTX |
| 0101 | INTERRUPT FLAG FROM ADC |
| ○○○ | ○○○ |
| 1111 | SOFTWARE TRIGGER |

FIG. 4

NONVOLATILE LOGIC MEMORY FOR COMPUTING MODULE RECONFIGURATION

CROSS-REFERENCE TO RELATED APPLICATION(S)

This application is a continuation of U.S. patent application Ser. No. 14/887,885 filed on Oct. 20, 2015 (now U.S. Pat. No. 10,452,594), which is incorporated herein by reference.

TECHNICAL FIELD

This invention generally relates to processing devices having nonvolatile memory and, in particular, to using nonvolatile logic arrays for configuration of a computing device.

BACKGROUND

Processing devices such as microcontroller units ("MCUs") typically have a limited number of modules or peripherals to be controlled by the given MCU. For example, one such device may provide 3 direct memory access ("DMA") channels, 3 enhanced universal serial communication interface ("eUSCI") instances, 1 analog to digital converter ("ADC") instance, and the like. If an application requires more than the instances available on the given MCU, the user has to reconfigure the instances manually by using the device's central processing unit ("CPU") or direct memory access module ("DMAM"), which costs software runtime and therefore increases the energy consumption of the device. Otherwise, the user might not be able to realize the application on the given device, for example, if the application is performance and/or energy sensitive. Additionally, different peripherals or device modules may need different configurations depending on the computing device's state. Providing and updating device and peripheral configurations, however, consumes excess time, energy, computing power, and bus traffic to receive, interpret, and execute reconfiguration of the peripherals.

SUMMARY

Generally speaking, pursuant to these various embodiments, configuration states for a computing device and/or associated peripherals (where such configuration states are also referred to as "profiles") are stored in one or more non-volatile logic ("NVL") arrays. Using the non-volatile sub-system for the computing device, triggers for reconfiguration of the respective device or peripherals are provided to an NVL array controller, which controls provision of the new profile(s) for the respective device or peripherals over a dedicated bus to a configuration register that stores the active profiles for the device and associated peripherals.

So configured, the profiles are stored in non-volatile logic arrays so that they are safely stored through power loss events. Moreover, by using a dedicated bus, the transfer of the profiles from the NVL arrays does not congest the system bus. Also, the profile transfer can then be effected using an NVL sub-system clock, which typically operates much faster than the computing device's system clock, thereby effecting transfer of the profiles in a much faster time period. The transfer of the profiles can be triggered by software or without any software interception by hardware triggers. These and other benefits may become clearer upon making a thorough review and study of the following detailed description.

BRIEF DESCRIPTION OF THE DRAWINGS

FIG. 2 is a map of one example of data stored in NVL arrays in accordance with various embodiments of the invention.

FIG. 3 is a map of another example of data stored in NVL arrays in accordance with various embodiments of the invention.

FIG. 4 includes two charts showing association of triggers with particular signals and profiles in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
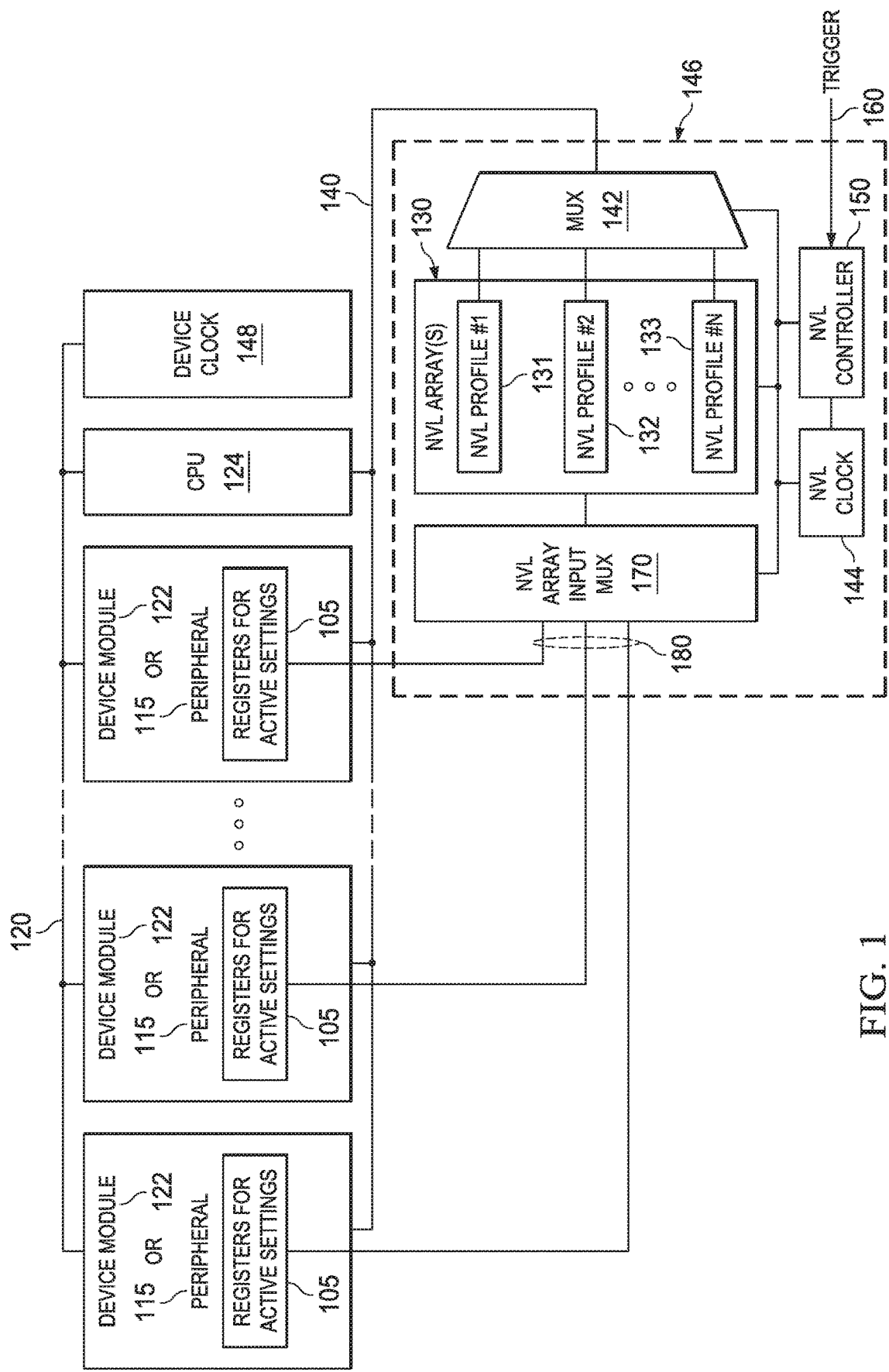
FIG. 1 is a block diagram of a computing device as configured in accordance with various embodiments of the invention.

Referring now to the drawings, and in particular to FIG. 1, an illustrative example device that is compatible with many of these teachings will now be presented. A computing device 100 includes configuration registers 105 configured to store configuration profile data for currently active settings of the computing device 100 or peripherals 115 associated with the computing device 100. These currently active settings are available via connection between the configuration registers 105 over a system bus 120. One or more non-volatile logic arrays 130 are configured to store a plurality of configuration profiles 131, 132, 133 for individual settings of the computing device 100 or peripherals 115 associated with the computing device 100. The NVL arrays 130 themselves may be a ferro-magnetic random access memory ("FRAM") based state retention technology that combines characteristics of FRAM memory with current data retention methods or other technologies with similar features such as spin-torque magnetoresistive random access memory ("MRAM") or resistive access memory ("RRAM"). Such memory technology is known in the art and requires no further description; see, for example, regarding FRAM U.S. Patent Application Publication Number 2014/0075088, which is incorporated herein by reference in its entirety.

An example data map for NVL array storage of configuration profiles is illustrated in FIG. 2. In the first column 205, profile numbers are stored to identify each profile. The array row is identified in the second column 210. Each row stores the configuration data for a given profile as indicated in the third column 215. In this example, Row 0 of a first NVL array 230 stores trigger information to allow the system to maintain the association of triggers to particular configuration changes. Rows 1, 2, and 3 individually store different configuration settings for the same Module 1 (i.e., a particular peripheral or computing device module). Rows 4 and 5 individually store different configuration settings for a different Module 2 (i.e., a different particular peripheral or computing device module). Configuration settings for further modules are stored in the further rows of the first NVL array 230 and in a second NVL array 232 and potentially other NVL arrays.

FIG. 3 illustrates another example data map for NVL array storage of configuration profiles. In this example, the NVL arrays 130 are also configured to store computing device or peripheral identifier information for individual ones of the plurality of configuration profiles. Here each profile is stored in its own row of the array. Like the example of FIG. 2, the first column 305 includes profile numbers stored to identify each profile. Here each profile is stored in its own row of the array. The array row is identified in the second column 310. Each row stores the configuration data for a given profile as indicated in the third column 315. In this example, rows 1, 2, . . . , M individually store the module identifier information and the different configuration settings for the module (i.e., a particular peripheral or computing device module) identified by the module identifier information. Further configuration settings for different or the same modules are stored in the further rows of the first NVL array 330 and in a second NVL array 332 and potentially other NVL arrays.

A non-volatile logic array controller 150 is configured to control the one or more NVL arrays 130 and receive a trigger 160. The computing device 100 is configured to generate the trigger 160 as either or both of a software trigger or a hardware trigger. Example hardware triggers include resets, internal or external interrupts, or any other status or trigger event. Example software triggers include CPU addressable computing device or peripheral register bits with the purpose to initiate a reconfiguration of one or more modules. In response to receiving the trigger, the NVL array controller 150 controls transfer of at least one of the plurality of configuration profiles to associated ones of the configuration registers 105.

In one example implementation, the NVL controller 150 is configured to receive a plurality of different triggers. Individual ones of the plurality of triggers effects transfer of different ones of the plurality of configuration profiles to associated ones of the configuration registers 105. An example of how different triggers are associated with different profiles is illustrated in FIG. 4. Each trigger has an identifier ("ID") that associates the trigger with a particular signal. Each identifier 410 is then also associated with a profile 420 that can be transferred to the active HW trigger assignment register from the addressed NVL array row 0 as illustrated in FIGS. 2 and 3. In this way particular triggers cause particular configuration changes, all controlled within the NVL subsystem. Several triggers can be assigned to a given profile. In addition, a global enable and disable register bit can be provided to enable or disable all hardware triggers.

Figure 5:
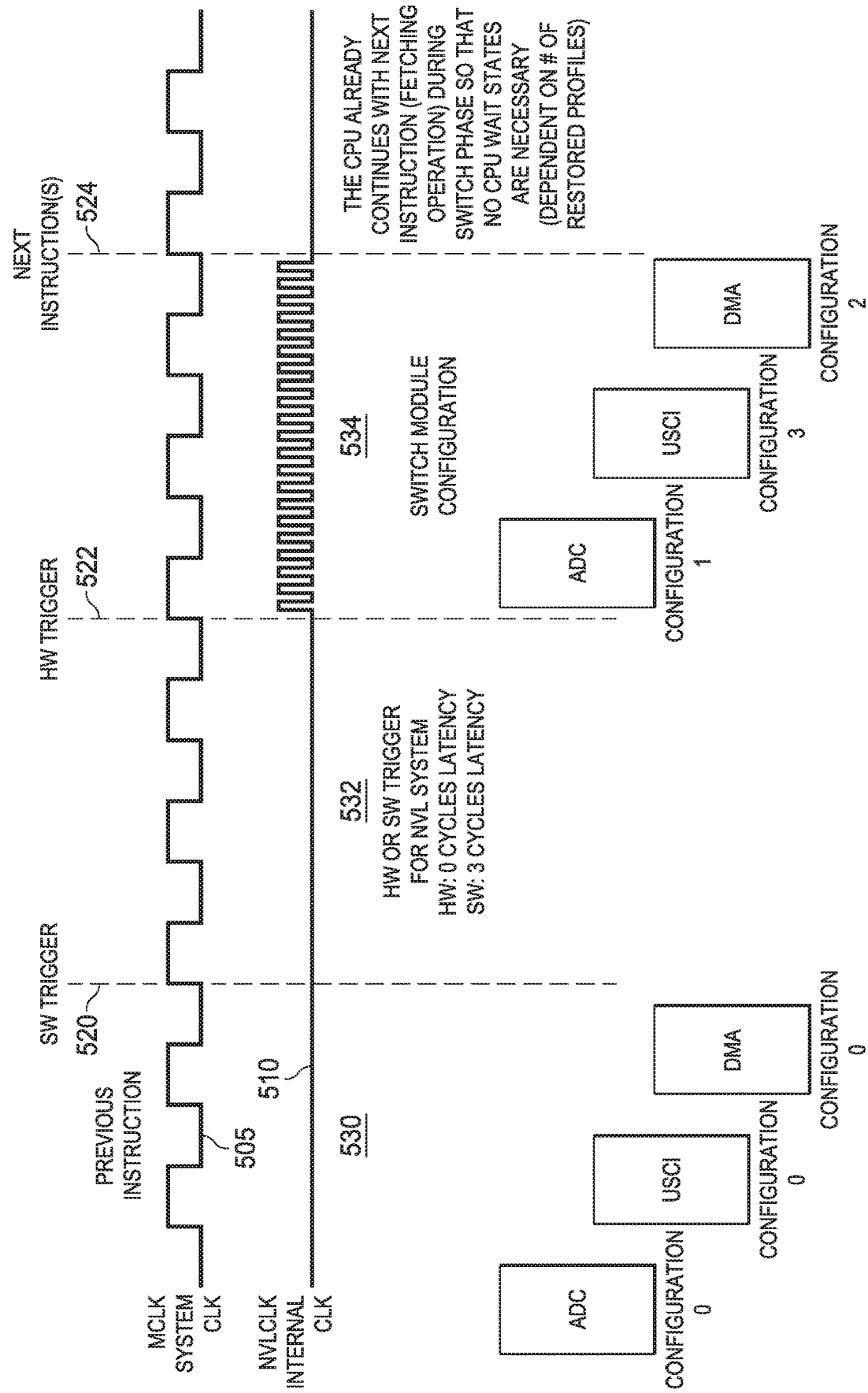
FIG. 5 is a timing diagram illustrating transfer of profile data using an NVL clock faster than the computing device's clock in accordance with various embodiments of the invention.

A dedicated bus 140 separate from the system bus 120 connects the one or more non-volatile logic arrays 130 and the configuration registers 105. The dedicated bus 140 allows the configuration registers 105 to operate under the control of the NVL subsystem. Therefore, the transfer of profiles from NVL storage into the active configuration register 105 can be done under the NVL subsystem's clock 144. In this approach, the NVL array controller 150 is configured to transfer at least one of the plurality of configuration profiles to associated ones of the configuration registers 105 using a clock 144 for a non-volatile logic sub-system 146 for the one or more non-volatile logic arrays 130. In a typical arrangement, a multiplexer 142 provides connection between individual arrays 130 or rows within an array 130 and the dedicated bus 140 such that all the elements of the NVL sub-system 146 operate under the NVL clock. The NVL clock 144 can operate at a different, faster clock speed than the computing device's clock 148. FIG. 5 illustrates one example of this arrangement. The first waveform 505 illustrates the computing device clock's signal, in this example at 16 MHz. The NVL clock 144 is illustrated by the second waveform 510. The modules ADC12_8, eUSCI_B0, eUSCI_B1, and DMA controller have a first configuration 0 in timeframes 530 and 532. The instruction fetch of a software trigger arrives at 520 and requires passage of a three cycle latency for this example system. A second trigger arrives before 522 as a hardware trigger, which does not cause a latency delay. In the time period 534, the new configurations 1, 3, and 2 for the different modules are loaded within the NVL sub-system according to the NVL clock cycle 510. By the time the next computing device clock cycle instruction is available at 524, the modules ADC12_8, eUSCI_B0, eUSCI_B1, and DMA controller are all fully reconfigured based on the software and hardware triggers. From the point of view of the computing device, a module reconfiguration is done within only one clock cycle for hardware triggers and within four clock cycles for software triggers.

To provide flexibility in implementation, the computing device 100 may be modifiable by a user to customize the plurality of the different triggers and associated transfer of the configuration profiles, thereby allowing users to specify configuration settings to be automatically set by particular triggers within the device 100. Referring again to FIG. 1, an NVL array input multiplexer 170 is disposed to selectively connect via a dedicated bus 180 (which in certain embodiments may be the same as the dedicated bus 140) to individual ones of the peripherals 115 or computing device 100 modules to individual rows of the one or more NVL arrays 130. This allows profile data to be loaded from the currently active register configurations of the peripherals and computing device. Additional profiles can be loaded from the peripherals at different times; for instance, when a given peripheral operates using a different configuration, that configuration can at that time be loaded into the NVL array as an alternative profile for that peripheral. In another approach, profile data can be pre-configured during device production, for example, by scan, or it can be written out of a dedicated buffer during an NVL store sequence. The profile data itself can be masked to further enhance customizability of the device 100. The transfer itself can be automated. For instance, the NVL array controller 150 can be configured to transfer at least one of the plurality of configuration profiles to associated ones of the configuration registers 105 according to the NVL sub-system 146 and hard-coded decoding or multiplexing logic. Optionally, the NVL array controller 150 and the one or more NVL arrays 130 may be dedicated solely to storage and transfer of the configuration profiles.

Figure 6:
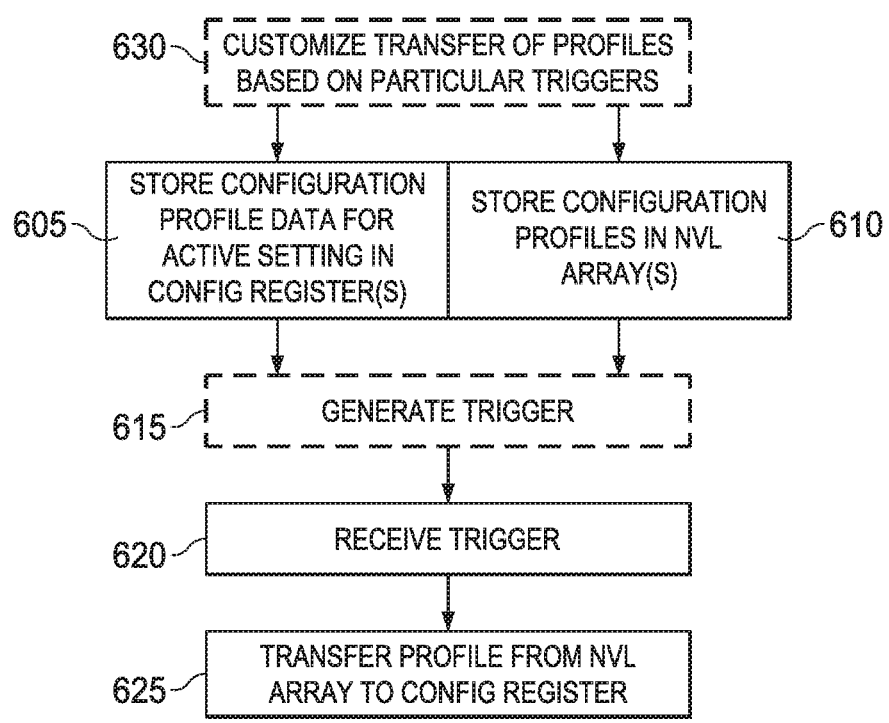
FIG. 6 is a flow chart illustrating a method of operation in accordance with various embodiments of the invention.

An example method of operation in accord with these disclosures is illustrated in FIG. 6. The method includes storing 605 in configuration registers of a computing device configuration profile data for currently active settings of the computing device or peripherals associated with the computing device and storing 610 in one or more NVL arrays a plurality of configuration profiles for individual settings of the computing device or peripherals associated with the computing device. This storing may further include storing in the one or more NVL arrays computing device or peripheral identifier information for individual ones of the plurality of configuration profiles.

A trigger is generated 615 as either or both of a software trigger or a hardware trigger. In response to receiving 620 a trigger, the method includes transferring 625 of at least one of the plurality of configuration profiles from the one or more NVL arrays to associated ones of the configuration registers. The transfer occurs over a dedicated bus separate from a system bus and which connects the one or more non-volatile logic arrays and the configuration registers. The transferring 625 may include transferring at least one of the plurality of configuration profiles to associated ones of the configuration registers. In still another aspect, the transferring 625 may include transferring at least one of the plurality of configuration profiles to associated ones of the configuration registers using clock for the one or more NVL arrays, wherein the clock operates at a different clock speed than the computing device's clock.

The trigger reception 620 optionally includes receiving a plurality of different triggers, wherein receiving individual ones of the plurality of triggers effects transfer of different ones of the plurality of configuration profiles to associated ones of the configuration registers. In another optional approach, the plurality of the different triggers and associated transfer of the configuration profiles are customized 630 in response to a user input to the computing device.

Figure 7:
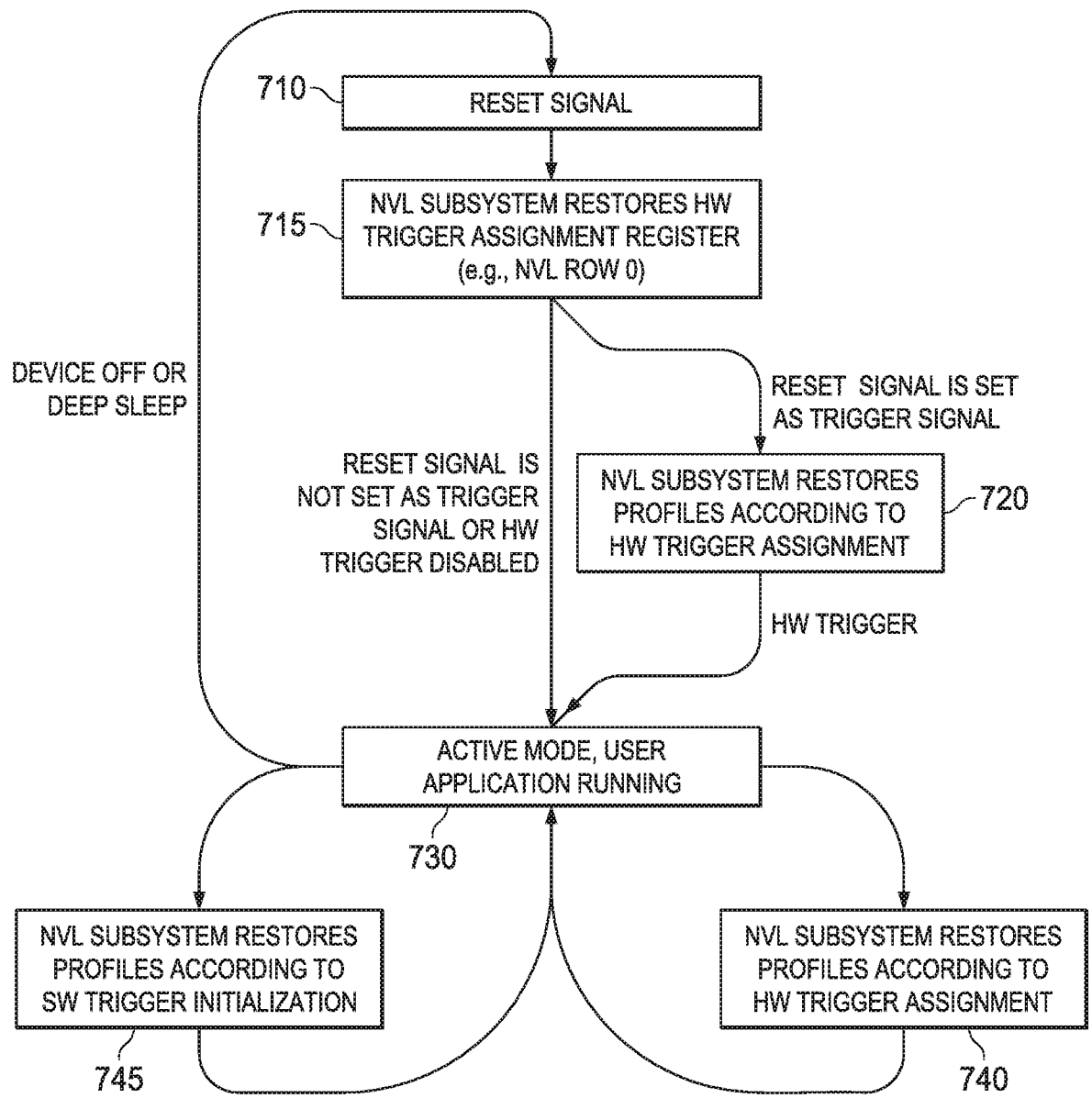
FIG. 7 is a flow chart illustrating a further method of operation in accordance with various embodiments of the invention.

A further use case is illustrated in FIG. 7. Here a reset signal 710 coming of a device off or deep sleep state triggers the NVL subsystem to restore the hardware trigger assignments from the NVL array storing the assignments. In the illustrations discussed above, NVL array row 0 stored those assignments. If the reset signal 710 is a trigger signal for restoring a profile from the NVL array, the NVL sub-system restores 720 one or more profiles according to the hardware trigger assignment as discussed above. If the reset signal 710 is not a trigger signal or the hardware trigger was disabled, the active mode for the computing device runs 730 including the user application for the device. During the device's operation another hardware trigger will effect restoration 740 by the NVL sub-system of one or more profiles according to that hardware trigger's assignment. The device's active mode with the user's application continues running 730 in parallel with the NVL operations in support of profile restoration. Similarly, during the device's operation software trigger can effect restoration 745 by the NVL subsystem of one or more profiles according to that software trigger's initialization and assignment. Like with the hardware trigger, the device's active mode with the user's application continues running 730 in parallel with the NVL operations in support of profile restoration. after which device's active mode with the user's application continues running 730. This loop continues until deep sleep more or device power down, whereupon another reset 710 occurs at wake up.

So configured, a computing device can store and implement many more module or peripheral configurations, which in turn increases the variable functionality of a given device. Moreover, the modules can be reconfigured on the fly and in some cases instantaneously from the point of view of the computing device. This speeds operation and responsiveness of the computing device and its peripherals. By using a dedicated bus, the system bus is not blocked during reconfiguration of a module. Moreover, by using hardware triggers, this approach facilitates automatic reconfiguration of devices based on such triggers. Thus, no software operation needs to be loaded to reconfigure a module. Also, multiple profiles can be loaded in one atomic operation for the computing device. Further, because the profile data may be masked, the solution can be highly customizable.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A computing device apparatus comprising:
   a computing component having a first configuration register configured to store configuration profile data;
   a first bus connected to a first terminal of the computing component;
   a non-volatile logic array configured to store a plurality of configuration profiles, the non-volatile logic array independent of the computing component;
   a second bus separate from the first bus, the second bus coupled to a second terminal of the computing component and providing a data transfer path between the non-volatile logic array and the first configuration register of the computing component;
   a multiplexer having a multiplexer input coupled to the first bus and a multiplexer output coupled to the non-volatile logic array, wherein the multiplexer is configured to transfer the configuration profile data to the non-volatile logic array; and
   a controller configured to control transfer of at least one of the plurality of configuration profiles between the first configuration register and the non-volatile logic array using the second bus.

2. The computing device apparatus of claim 1, wherein the controller is configured to control the transfer of at least one of the plurality of configuration profiles between the first configuration register and the non-volatile logic array in response to a trigger.

3. The computing device apparatus of claim 2, wherein is one of a software trigger or a hardware trigger.

4. The computing device apparatus of claim 3, wherein the hardware trigger indicates an event, the event being one of an interrupt event, a brown out reset (BOR) event, or a power-up clear (PUC) event.

5. The computing device apparatus of claim 4, wherein each hardware trigger has a trigger identifier value associated therewith, each trigger identifier value indicating a respective one of the events.

6. The computing device apparatus of claim 3, wherein, when the trigger is a hardware trigger, the controller is configured to control the transfer of at least one of the plurality of configuration profiles between the first configuration register and the non-volatile logic array is performed with substantially no latency delay following arrival of the hardware trigger.

7. The computing device apparatus of claim 6, wherein the transfer of at least one of the plurality of configuration profiles between the first configuration register and the non-volatile logic array is performed using a sub-system clock having a first frequency that is different than a second frequency of a system clock of the computing device apparatus.

8. The computing device apparatus of claim 3, wherein, when the trigger is a software trigger, the controller is configured to control the transfer of at least one of the plurality of configuration profiles between the first configuration register and the non-volatile logic array is performed after a latency delay following arrival of the hardware trigger.

9. The computing device apparatus of claim 8, wherein the transfer of at least one of the plurality of configuration profiles between the first configuration register and the non-volatile logic array is performed using a sub-system clock having a first frequency that is different than a second frequency of a system clock of the computing device apparatus, and wherein the latency delay is at least one cycle of the system clock.

10. The computing device apparatus of claim 9, wherein the latency delay is three cycles of the system clock.

11. The computing device apparatus of claim 9, wherein the first frequency is greater than the second frequency.

12. The computing device apparatus of claim 3, wherein:
when the trigger is a hardware trigger, the controller is configured to control the transfer of at least one of the plurality of configuration profiles between the first configuration register and the non-volatile logic array is performed with substantially no latency delay following arrival of the hardware trigger; and
when the trigger is a software trigger, the controller is configured to control the transfer of at least one of the plurality of configuration profiles between the first configuration register and the non-volatile logic array is performed after a latency delay following arrival of the hardware trigger.

13. The computing device apparatus of claim 12, wherein the transfer of at least one of the plurality of configuration profiles between the first configuration register and the non-volatile logic array is performed using a sub-system clock having a first frequency that is different than a second frequency of a system clock of the computing device apparatus.

14. The computing device apparatus of claim 13, wherein the first frequency is greater than the second frequency.

15. The computing device apparatus of claim 13, wherein the latency delay is one or more cycles of the system clock.

16. The computing device apparatus of claim 2, wherein the transfer of the at least one of the plurality of configuration profiles between the first configuration register and the non-volatile logic array is a transfer of the at least one of the plurality of configuration profiles to the first configuration register, and wherein the controller is configured to receive a plurality of different triggers, each of the triggers causing the controller to transfer a different one of the plurality of configuration profiles to the first configuration register.

17. The computing device apparatus of claim 1, wherein the computing component is a first computing component, and the computing device apparatus includes a second computing component having a second configuration register configured to store the configuration profile data, wherein:
the first bus is connected in common to the first terminal of the first computing component and a third terminal of the second computing component; and
the second bus is connected in common to the second terminal of the first computing component and a fourth terminal of the second computing component.

* * * * *